US009446770B2

(12) United States Patent
Valeri et al.

(10) Patent No.: US 9,446,770 B2
(45) Date of Patent: Sep. 20, 2016

(54) METHOD AND APPARATUS FOR MONITORING A REAR PASSENGER SEATING AREA OF A VEHICLE

(71) Applicant: GM GLOBAL TECHNOLOGY OPERATIONS LLC, Detroit, MI (US)

(72) Inventors: Frank C. Valeri, Novi, MI (US); Scott M. Reilly, Southfield, MI (US); Eli Tzirkel-Hancock, Ra'Anana (IL); Gaurav Talwar, Novi, MI (US); John L. Holdren, Ferndale, MI (US); Xufang Zhao, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/608,776

(22) Filed: Jan. 29, 2015

(65) Prior Publication Data

US 2016/0221583 A1 Aug. 4, 2016

(51) Int. Cl.
| | | |
|---|---|---|
| *B60W 10/30* | (2006.01) | |
| *G10L 17/00* | (2013.01) | |
| *B60W 50/00* | (2006.01) | |
| *B60W 40/08* | (2012.01) | |

(52) U.S. Cl.
CPC .......... *B60W 50/0098* (2013.01); *B60W 10/30* (2013.01); *B60W 40/08* (2013.01); *G10L 17/005* (2013.01); *B60W 2420/54* (2013.01)

(58) Field of Classification Search
CPC ... G10K 11/16; G10K 11/178; B60W 10/30; B60W 40/08; G10L 17/005
USPC ..................... 701/48, 36; 340/457; 381/71.11
See application file for complete search history.

(56) References Cited

U.S. PATENT DOCUMENTS

| | | | | |
|---|---|---|---|---|
| 6,343,127 | B1 * | 1/2002 | Billoud .............. | G10K 11/1788 381/71.4 |
| 7,536,018 | B2 * | 5/2009 | Onishi ............... | G10K 11/1786 381/71.1 |
| 8,027,484 | B2 * | 9/2011 | Yoshida ............. | G10K 11/1788 381/71.11 |
| 8,315,404 | B2 * | 11/2012 | Shridhar ............ | G10K 11/1782 341/110 |
| 2008/0152158 | A1 * | 6/2008 | Sakamoto .......... | G10K 11/1786 381/71.4 |
| 2010/0124337 | A1 * | 5/2010 | Wertz ................. | G10K 11/1782 381/71.11 |
| 2010/0266135 | A1 | 10/2010 | Theobald et al. | |
| 2011/0074565 | A1 * | 3/2011 | Cuddihy ............... | B60N 2/002 340/457 |
| 2014/0169578 | A1 | 6/2014 | Jung | |
| 2014/0226831 | A1 | 8/2014 | Tzirkel-Hancock et al. | |
| 2014/0303807 | A1 * | 10/2014 | Addepalli ............ | H04W 4/046 701/1 |

* cited by examiner

*Primary Examiner* — Tan Q Nguyen
(74) *Attorney, Agent, or Firm* — Quinn Law Group, PLLC

(57) ABSTRACT

A vehicle including a passenger compartment having a rear seating area is described. A method for monitoring the rear seating area of the passenger compartment includes monitoring a vehicle operating state comprising one of a key-on state and a key-off state and monitoring the rear seating area. A presence or absence of a passenger in the rear seating area is detected based upon the monitoring, and a control routine is executed based upon the vehicle operating state and the presence or absence of a passenger in the rear seating area.

13 Claims, 4 Drawing Sheets

METHOD AND APPARATUS FOR MONITORING A REAR PASSENGER SEATING AREA OF A VEHICLE

TECHNICAL FIELD

This disclosure relates to a passenger compartment for a vehicle.

BACKGROUND

Passengers in a rear seating area of a vehicle passenger compartment may generate location-specific sounds.

SUMMARY

A vehicle including a passenger compartment having a rear seating area is described. A method for monitoring the rear seating area of the passenger compartment includes monitoring a vehicle operating state comprising one of a key-on state and a key-off state and monitoring the rear seating area. A presence or absence of a passenger in the rear seating area is detected based upon the monitoring, and a control routine is executed based upon the vehicle operating state and the presence or absence of a passenger in the rear seating area.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
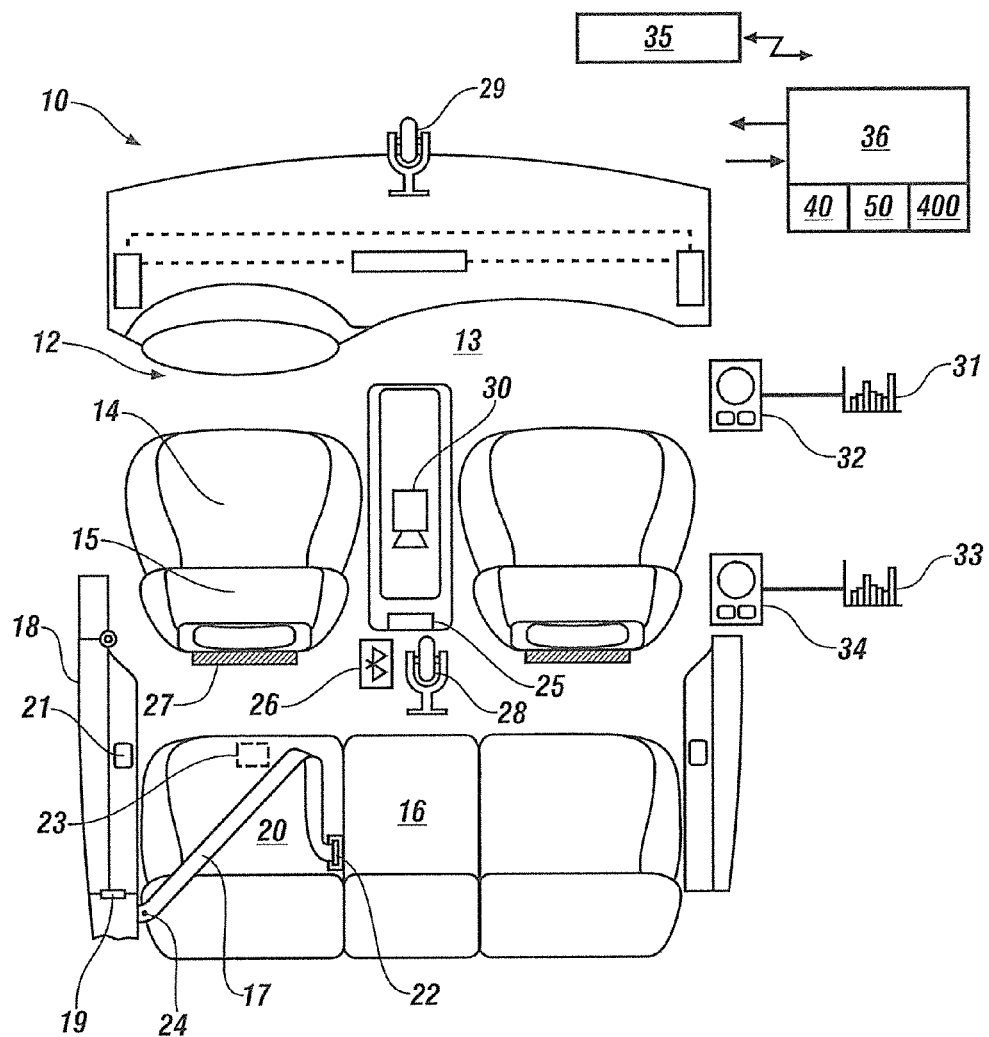
FIG. 1 schematically illustrates a top plan view of a passenger compartment of a vehicle including a front seating area and a rear seating area, in accordance with the disclosure.

Referring now to the drawings, wherein the depictions are for the purpose of illustrating certain exemplary embodiments only and not for the purpose of limiting the same, FIG. 1 schematically illustrates a top plan view of a passenger compartment 12 of a vehicle 10 including a front seating area 13 and a rear seating area 16. The rear seating area 16 includes a single one or a plurality of passenger seats 20 that are accessible through a rear door 18 (as shown) or through a front door (not shown) by forward tilting of a seat back 15 of a front seat 14. Each rear passenger seat 20 is equipped with a seat belt 17 and an accompanying buckle. The passenger compartment 12 and rear seating area 16 are equipped with one or more of the following sensors and control elements. The sensors and control elements include a rear door latch sensor 19 when the vehicle 10 includes a rear door, a rear door window control switch 21 for controlling raising and lowering of an adjacent electrically-powered window, a rear seat belt/buckle sensor 22, a rear seat occupant sensor 23, rear seat position controls 24, rear seat HVAC controls 25, rear seat short-range wireless connection 26, a rear seat infotainment system and controls 27, one or more microphones preferably including a rear seat microphone 28 and a front seat microphone 29 that are coupled to an in-vehicle and an extra-vehicle communications system 35 and a rear seat camera 30. One or more front active noise cancellation (F-ANC) speaker(s) 32 and one or more rear active noise cancellation (R-ANC) speaker(s) 34 operatively connect to a controller 36, with the controller 36 executing active noise cancellation (ANC) routines to control, mitigate, offset and otherwise alter noise levels in the front and rear passenger seating areas 13, 16 by generating a front ANC signal 31 for controlling the F-ANC speaker(s) 32 and generating a rear ANC signal 33 for controlling the R-ANC speaker(s) 34. In one embodiment, either or both the front and/or rear seat microphones 29, 28 may be supplanted by microphone(s) incorporated into the F-ANC speaker(s) 32 and/or the R-ANC speaker(s) 34. Other sensors and control elements may be employed in addition to or in place of those described herein. The controller 36 signally and/or operatively connects to the sensors and control elements, and can include a single one or a plurality of controllers. It is appreciated that some embodiments may employ only a portion of the aforementioned sensors and/or control elements. The controller 36 includes an extra-vehicle communications system in one embodiment, i.e., a system that can wirelessly communicate with devices beyond the vehicle, including one or more of a cellular telephonic system, a communications satellite linkage and/or another form of wireless communications. The controller 36 preferably includes a global positioning system (GPS) that provides a signal that can be employed to geographically locate the vehicle 10.

The term controller and similar terms including, e.g., control module, module, control, control unit and processor refer to any one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). Each non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with each such input monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds or 3.125, 6.25, 12.5, 25 and 100 milliseconds during ongoing operation. Alternatively, routines may be executed in response to occurrence of a triggering event. Communications between controllers and between controllers, actuators and/or sensors may be accomplished using a direct wired link, a networked communications bus link, a wireless link or any another suitable communications link. Communications include exchanging data signals in any suitable form, including, for example, electrical signals via a conductive medium, electromagnetic signals via air, optical signals via optical waveguides, and the like. Each controller is capable of dynamic execution. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Figure 2:
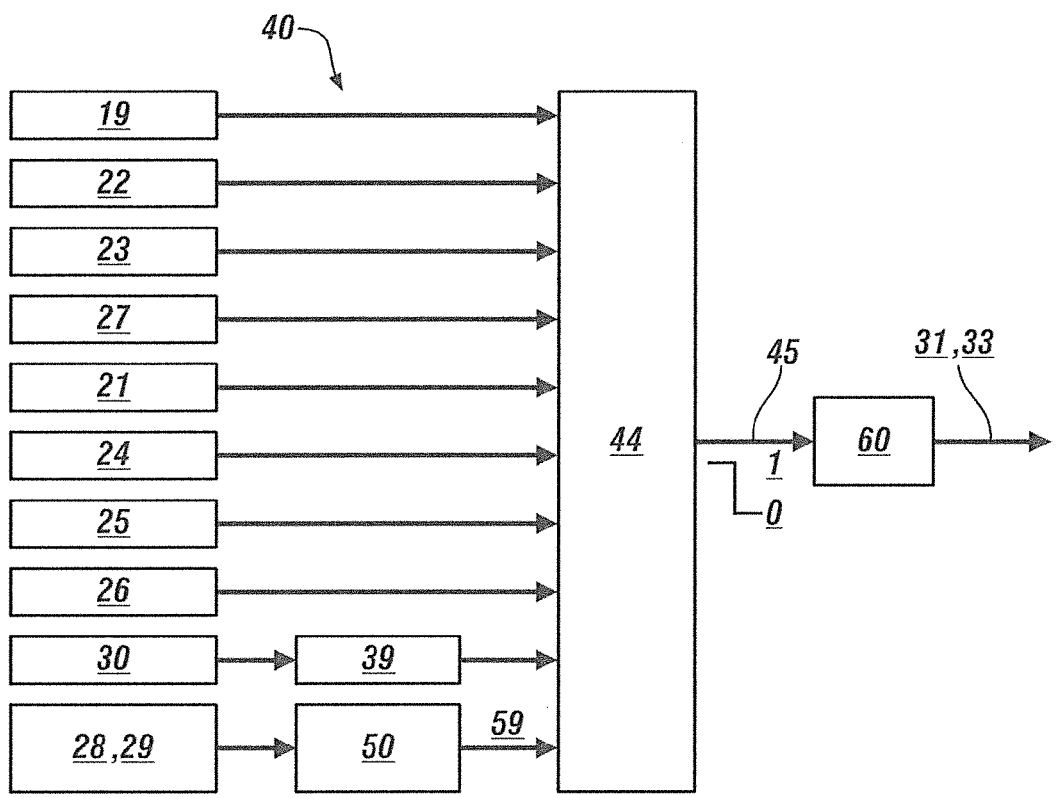
FIG. 2 schematically shows a sensor integration and fusion process for monitoring the rear seating area to the detect presence of a passenger by evaluating signal inputs from the sensors and control elements, in accordance with the disclosure.

FIG. 2 schematically shows a sensor integration and fusion process 40 for monitoring the rear seating area 16 to detect the presence of a passenger therein by evaluating input signals from the sensors and actuator commands from control elements described herein. The input signals from the sensors and actuator commands from the control elements include one or more of the following: rear door latch sensor 19, rear door window control switch 21, rear seat belt/buckle sensor 22, rear seat occupant sensor 23, rear seat position controls 24, rear seat HVAC controls 25, a rear seat short-range wireless connection 26, rear seat infotainment system and controls 27, front and rear microphones 29, 28 (or functional equivalents) that couple to the in-vehicle and extra-vehicle communications system 35 and rear seat camera 30. An input signal from the rear seat camera 30 is subjected to one or more known image processing routines 60 to discern data that may indicate presence of a passenger in the rear seating area 16. Input signals from the front and rear microphones 29, 28 are subjected to one or more audio signal processing routines 50 to discern data that may indicate presence of a passenger in the rear seating area 16.

The aforementioned signals are input to a controller-executable sensor fusion routine 44. The sensor fusion routine 44 analytically combines sensory data and actuator commands from the disparate sources such that the resulting information more accurately detects presence of a passenger in the rear seating area 16. The sensor fusion routine 44 employs a plurality of logic operators, e.g., OR gates, NOR gates, AND gates, etc., and data weighting schemes to evaluate all the sensory data and detect presence of a passenger when so indicated by one or more of the sensors. By combining and evaluating outputs of multiple sensors and control elements, occurrence of Type I (false positive) errors and occurrence of Type II (false negative) errors associated with detecting presence of a rear seat passenger can be reduced. The sensor fusion routine 44 generates an output signal 45 that indicates whether a passenger is present in the rear seating area 16. The output signal 45 can be in the form of a discrete signal having an output of "1" associated with presence of a passenger in the rear seating area 16 and an output of "0" associated with absence of a passenger in the rear seating area 16. The output signal 45 is employed by a sound control routine 60 to generate an audio output based upon location(s) of passenger(s). When the output signal 45 indicates a high likelihood (1) that one or more passengers is present in the rear seating area 16, and the vehicle is operating, the controller 36 executes a rear-seat-specific active noise cancellation (R-ANC) routine that includes generating a suitable rear ANC signal 33 for controlling the R-ANC speaker(s) 34. This involves generating signals at both the F-ANC speaker(s) 32 and the R-ANC speaker(s) 34 to cancel out engine noise in the entire cabin. When the output signal 45 indicates a low likelihood (0) that there are passengers present in the rear seating area 16 and the vehicle is operating, the controller 36 executes a front-seat-specific active noise cancellation (F-ANC) routine that includes generating a suitable front ANC signal 31 for controlling the F-ANC speaker(s) 32 and deactivating or disabling the rear ANC signal 33 for controlling the R-ANC speaker(s) 34. This involves generating signals only at the F-ANC speaker(s) 32 to cancel out engine noise in the front seating area only when no passengers are detected in the back seat.

Figure 3:
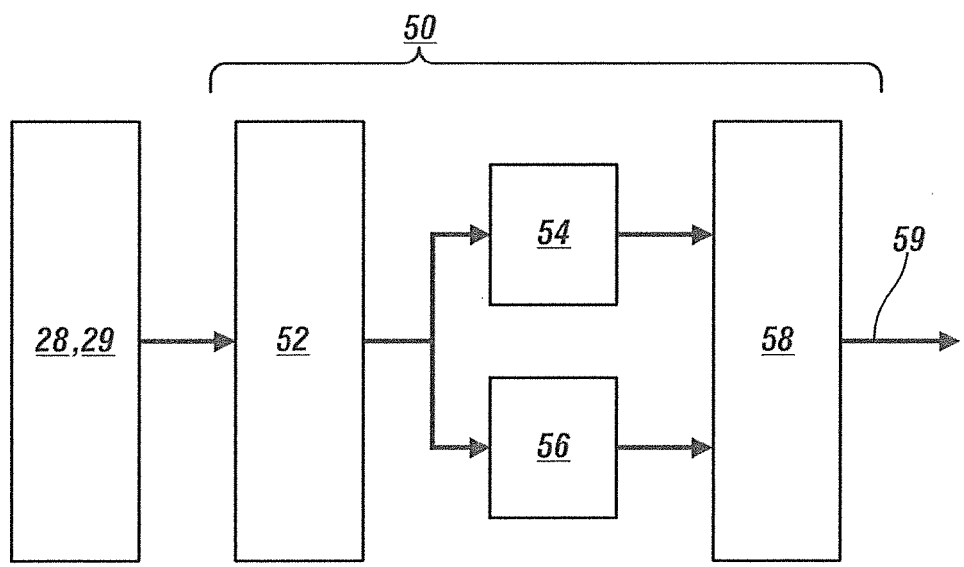
FIG. 3 schematically shows an embodiment of the audio signal processing routine to generate an audio output, including a speech detection routine, a delay estimation routine, a sound power differentiator routine and a classifier routine, in accordance with the disclosure.

FIG. 3 schematically shows an embodiment of the audio signal processing routine 50 referenced in FIG. 2 to detect the presence of a passenger in the back seat based upon audio signals captured employing one or more microphones. The audio signal processing routine 50 includes a speech detection routine 52, a delay estimation routine 54, a sound power differentiator routine 56 and a classifier routine 58. The speech detection routine 52 dynamically executes a frequency spectrum analysis of sounds captured by the front and rear microphones 29, 28 to detect audible sounds that may be associated with human speech, and determine a magnitude of power associated with those audible sounds. Human speech has known patterns that can be detected using frequency spectrum analysis. The detected audible sounds associated with human speech and associated magnitudes of power are input to the delay estimation routine 54 and the sound power differentiator routine 56. The delay estimation routine 54 measures and evaluates differences in times of arrival of similar signals associated with human speech between the front and rear microphones 29, 28. Speech related signals from a passenger in the rear seating area 16 are delayed in time when measured by the front microphone 29 as compared to the same signals measured by the rear microphone 28. Speech related signals from a passenger in the front seating area 13 are delayed in time when measured by the rear microphone 28 as compared to the same signals measured by the front microphone 29. Such delays in time can be employed to detect location(s) of passenger(s) in the front seating area 13 and the rear seating area 16.

The sound power differentiator routine 56 measures and evaluates magnitudes of power, e.g., in decibels (db) of similar signals associated with human speech between the front and rear microphones 29, 28. The magnitude of power of speech signals from a passenger in the rear seating area 16 are reduced when measured by the front microphone 29 as compared to the same signals measured by the rear microphone 28. The magnitude of power of speech related signals from a passenger in the front seating area 13 are reduced when measured by the rear microphone 28 as compared to the same signals measured by the front microphone 29. Such power reductions can be employed to detect location(s) of passenger(s) in either the front seating area 13 or the rear seating area 16.

Signal outputs from the delay estimation routine 54 and the sound power differentiator routine 56 are regularly and periodically monitored by the classifier routine 58, which evaluates the aforementioned signal outputs and aggregates such signals during multiple speech intervals of a key-on/key-off cycle to estimate location of passengers, including estimating the presence of a passenger in the rear seating area 16 during each cycle. As is appreciated, evaluating multiple speech intervals reduces the likelihood of Type I (false positive) errors and Type II (false negative) errors. The classifier routine 58 generates an output signal 59 that indicates a likelihood of presence of one or more passengers in the rear seating area 16.

Figure 4:
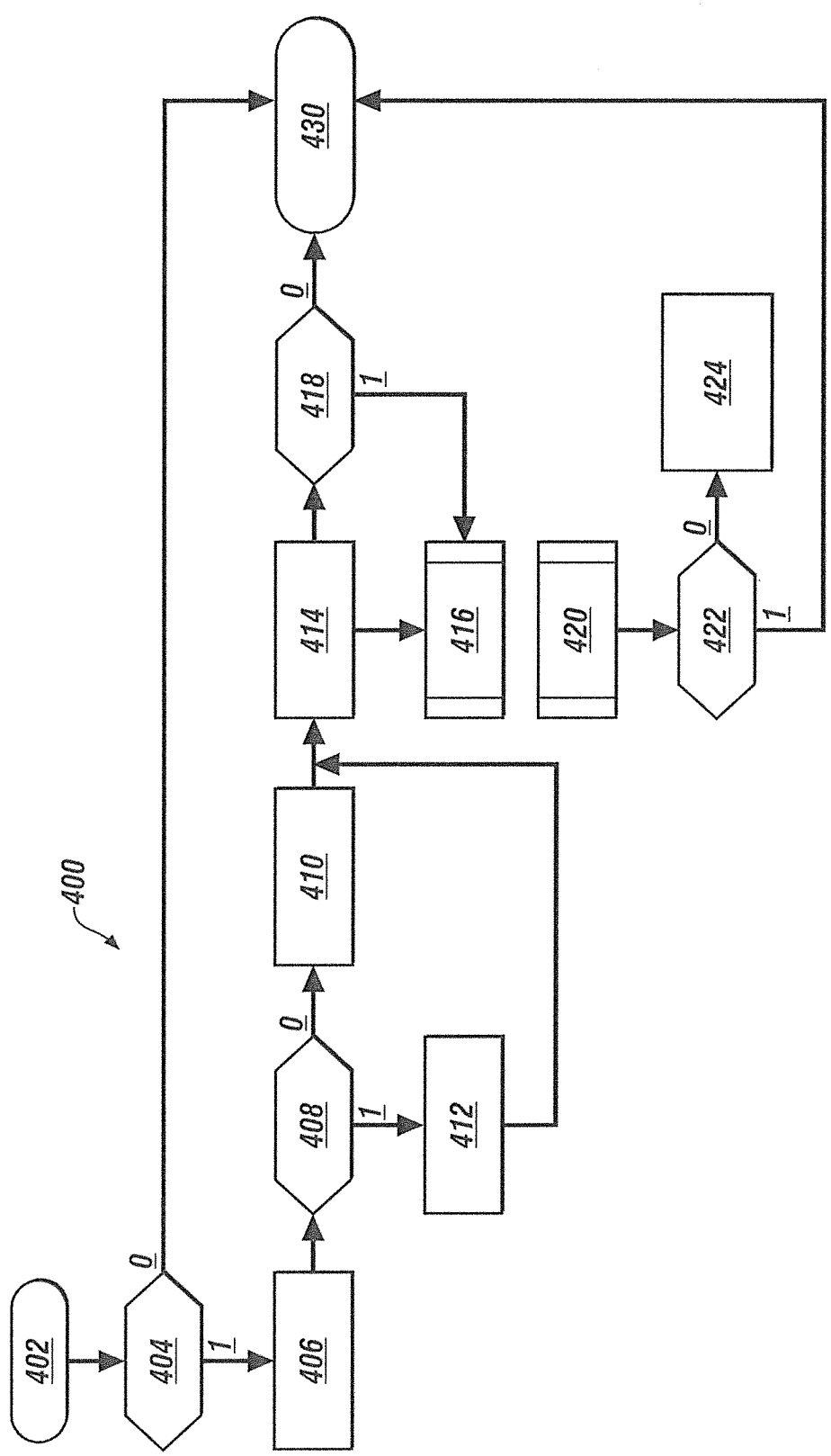
FIG. 4 schematically shows an infant distress detection routine for detecting the presence of a distressed infant in a passenger compartment of a vehicle after shutdown, in accordance with the disclosure.

FIG. 4 schematically shows an infant distress detection routine 400 that is executed as one or a plurality of control routines that are reduced to algorithmic code that is stored in a non-transitory memory device for execution by the controller 36 for detecting the presence of a distressed infant in-vehicle after vehicle shutdown, employing an embodiment of the passenger compartment 12 of the vehicle 10 described hereinabove. Table 1 is provided as a key wherein the numerically labeled blocks and the corresponding functions are set forth as follows, corresponding to the infant distress detection routine 400.

TABLE 1

| BLOCK | BLOCK CONTENTS |
|---|---|
| 402 | Detect vehicle key-off; initiate routine |
| 404 | Do sensors indicate possibility of passenger remaining in rear seating area, e.g., Active Latch/Buckle, Weight Sensors in Rear Seat, Supplementary Camera Snapshots |
| 406 | Activate microphone and collect, evaluate sounds |
| 408 | Are there multiple microphones? |
| 410 | Open available microphone channel |
| 412 | Open microphone monitoring rear seating area |
| 414 | Collect speech data and execute speech recognition |
| 416 | Execute formant analysis |
| 418 | Is infant speech detected? |
| 420 | Check for elevated formant frequencies |
| 422 | Is infant speech indicating distress? |
| 424 | Intervene |
| 430 | End |

The infant distress detection routine 400 executes as follows, and is initiated in response to a vehicle key-off event (402). In-vehicle sensors, such as described with reference to FIG. 1, are monitored to determine if they indicate a possibility or likelihood of a passenger remaining in the vehicle, and particularly remaining in the rear seating area 16 (404). Such monitoring includes, but is not limited to detecting opening and subsequent closing of one or both rear doors via activation of door latch(es) 19, detecting whether one of the rear seat belts 17 remains buckled, detecting continued mass on one of the rear seats 20 indicated by the rear seat occupant sensor 23, and detecting presence of a body or movement of a body via the rear seat camera 30. When the in-vehicle sensors fail to indicate a possibility or likelihood of a passenger remaining in the vehicle, and particularly remaining in the rear seating area 16 (404)(0), the infant distress detection routine 400 ends execution without further action (430). When the in-vehicle sensors indicate some possibility or likelihood of a passenger remaining in the vehicle, and particularly remaining in the rear seating area 16 (404)(1), the in-vehicle microphone(s) is activated to collect and evaluate in-vehicle sounds (406). This can include determining if there are multiple microphones, e.g., the rear seat microphone 28 and front seat microphone 29 described with reference to FIG. 1 (408). If so (408)(1), the microphone that monitors the rear seating area 16, i.e., the rear microphone 28 is opened (412). Otherwise (408)(0), an available microphone that is situated to monitor the rear seating area 16 is opened (410). This can include opening a single on-vehicle microphone when the vehicle has only one microphone.

A controller, e.g., BCM 36 signally coupled to the microphone 29 collects audible data and executes a speech recognition routine, which preferably includes some form of frequency spectrum analysis of the monitored audible data (414). The frequency spectrum analysis is employed to execute formant analysis of the monitored audible data (416). Formants are defined as distinguishing or meaningful frequency components of human voices, and are derived from a range of frequencies of a complex sound in which there is an absolute or relative maximum sound amplitude within the audible sound spectrum. A formant indicates one or more acoustic resonance points that can be characterized by resonant frequency and amplitude.

Figure 5:
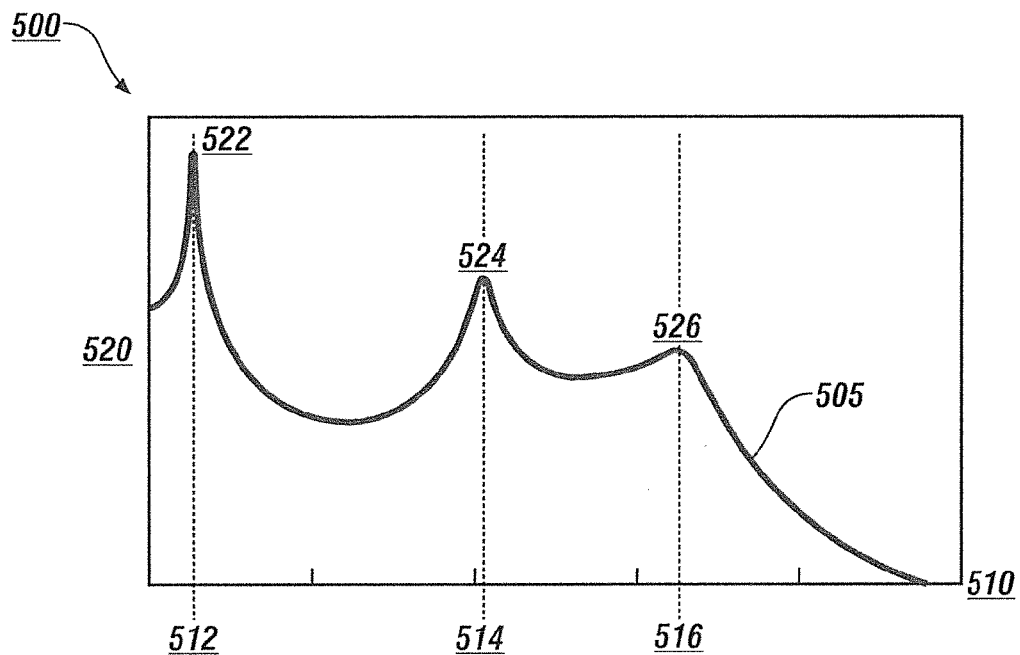
FIG. 5 graphically shows an example of a frequency spectrum analysis of an audible human voice, plotted in terms of sound amplitude (db) in relation to frequency (kHz), in accordance with the disclosure.

FIG. 5 graphically shows an example of a frequency-amplitude spectrum 500 of one example of a human voice 505, plotted in terms of sound amplitude (db) 520 on the vertical axis in relation to frequency (kHz) 510 on the horizontal axis. As shown, there are three amplitude peaks 522, 524 and 526 at different resonant frequencies 512, 514 and 516, respectively. The amplitude peaks 522, 524 and 526 are in descending magnitude with increased resonant frequency in this example. The descending amplitude peaks 522, 524 and 526 and corresponding resonant frequencies 512, 514 and 516 are also referred to as formants F1, F2 and F3, wherein formant F1 refers to a resonant frequency associated with a maximum of the amplitude peaks of the frequency-amplitude spectrum 500, formant F2 refers to a resonant frequency associated with a second peak that is less than the maximum of the amplitude peaks of the frequency-amplitude spectrum 500, and formant F3 refers to a resonant frequency associated with a third peak that is less than the maximum of the amplitude peaks of the frequency-amplitude spectrum 500 and less than the second peak. It is appreciated that the arrangement of formants F1, F2 and F3 differs for different human voices. Such a frequency analysis can be executed for any human or other voice, with different formants identifiable for different voices. An analytical process can be developed and executed to dynamically provide a frequency spectrum analysis for a sample of a human voice employing an on-vehicle controller.

Figure 6:
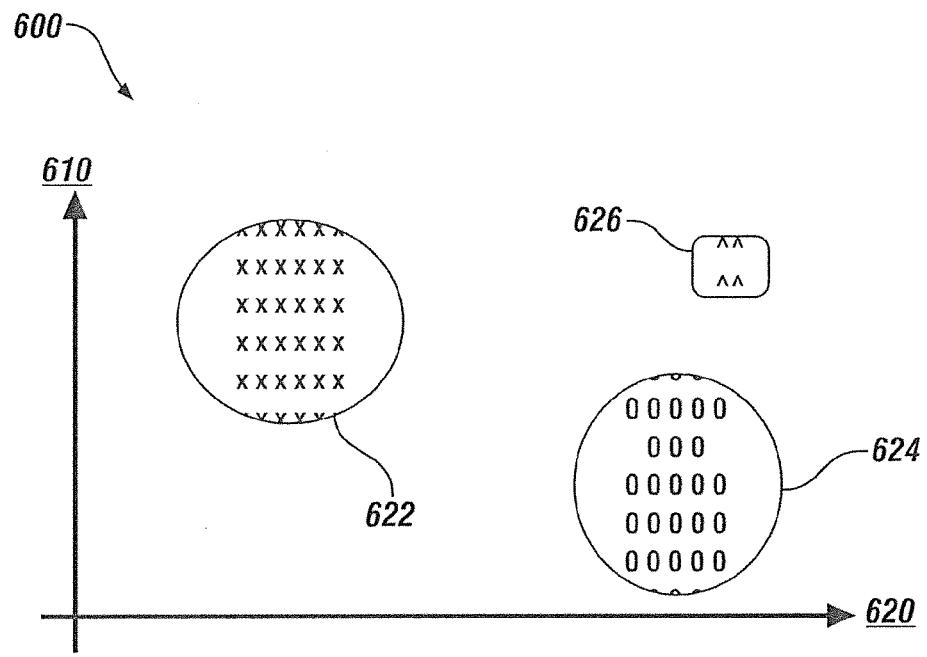
FIG. 6 graphically shows an example of a formant analysis graph for analyzing human and other voices, plotted in terms of a first formant frequency (Hz) in relation to a second formant frequency (Hz), in accordance with the disclosure.

FIG. 6 graphically shows an example of a formant analysis graph 600 for analyzing human and other voices, plotted in terms of the first formant frequency F1 610 (Hz) on the vertical axis in relation to the second formant frequency F2 620 (Hz) on the horizontal axis. The first formant frequency F1 610 and the second formant frequency F2 620 are derived for a voice data sample using the frequency-amplitude spectrum analysis 500 described with reference to FIG. 5. A first cluster 622 is shown and includes a relatively low frequency for the second formant F2 620 in relation to a relatively higher frequency for the first formant F1 610, which generally correlates to adult male voice patterns. A second cluster 624 is shown and includes a relatively high frequency for the second formant F2 620 in relation to a relatively lower frequency for the first formant F1 620, which generally correlates to adult female voice patterns. A third cluster 626 is shown and includes a relatively high frequency for the second formant F2 620 in relation to a relatively high frequency for the first formant F1 610, which generally correlates to voice patterns associated with infants in distress. Other formant analyses can be developed.

Referring again to FIG. 4, the formant analysis includes evaluating formants of the monitored audible data to determine whether they correspond to or include infant speech (418). If not (418)(0), the infant distress detection routine 400 ends execution without further action (430). When the evaluation of the formants of the monitored audible data corresponds to or includes infant speech (418)(1), the data is further analyzed (420) to determine whether the sounds correspond to speech indicating distress (422). This can include evaluations to correlate the monitored audible data with formant frequencies that are associated with whimpering, crying, screaming or another indicator of distress, e.g., as described with reference to FIG. 6. When the analysis fails to indicate distress (422)(0), the infant distress detection routine 400 ends execution without further action (430).

When the analysis indicates distress (422)(1), appropriate action can be undertaken as directed by the on-vehicle controller 36 (424). Examples of appropriate action can include the controller 36 commanding opening one or more of the vehicle windows, e.g., the electrically-powered rear window via control switch 21, the controller 36 starting the vehicle and activating the HVAC system via the rear-seat HVAC controls 25 to adjust ambient temperature in the passenger compartment, the controller 36 employing the extra-vehicle communications system 35 to call the cellphone of the vehicle owner and notify emergency personnel of the vehicle location via the extra-vehicle communications system 35 and associated GPS.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A method for monitoring a rear seating area of a passenger compartment of a vehicle, the method comprising:
   monitoring, by an on-vehicle controller, a vehicle operating state comprising one of a key-on state and a key-off state;
   monitoring the rear seating area to detect presence or absence of a passenger in the rear seating area, including monitoring input signals associated with a plurality of sensing devices and monitoring actuator commands from control elements associated with the rear seating area, and executing a sensor fusion routine to evaluate the input signals and the actuator commands; and
   executing a control routine based upon the vehicle operating state and the presence or absence of a passenger in the rear seating area, including executing an audio signal processing routine to detect the presence or absence of a passenger in the rear seating area, including:
      dynamically capturing audio signals employing the front and rear microphones;
      determining differences in times of arrival of the audio signals between the front and rear microphones;
      determining differences in magnitudes of power of the audio signals between the front and rear microphones; and
      evaluating the differences in times of arrival of the audio signals and the differences in magnitudes of power of the audio signals to determine the presence of a passenger in the rear seating area.

2. The method of claim 1, wherein monitoring input signals associated with a plurality of sensing devices comprises monitoring input signals from at least one of a rear door latch sensor, a rear seat belt/buckle sensor, a rear seat occupant sensor, front and rear microphones and a rear seat camera.

3. The method of claim 1, wherein monitoring the rear seating area further comprises monitoring actuator commands from control elements associated with the rear seating area.

4. The method of claim 3, wherein monitoring actuator commands from control elements associated with the rear seating area comprises monitoring actuator commands from at least one of a rear door window control switch, a rear seat position control, a rear seat HVAC control and a rear seat infotainment system and controls.

5. The method of claim 1, wherein executing the sensor fusion routine to evaluate the input signals and the actuator commands comprises employing logic operators to evaluate the input signals and the actuator commands.

6. The method of claim 1, further comprising dynamically executing a frequency spectrum analysis of the audio signals captured by the front and rear microphones to detect audible sounds associated with human speech and a magnitude of power associated therewith.

7. The method of claim 1, wherein executing a control routine based upon the vehicle operating state and the presence or absence of a passenger in the rear seating area comprises executing a rear seat-specific active noise cancellation routine only when a passenger is determined to be present in the rear seating area and the vehicle is in the key-on state.

8. A method for monitoring a rear seating area of a passenger compartment of a vehicle, the method comprising:
   monitoring, by an on-vehicle controller, a vehicle operating state comprising one of a key-on state and a key-off state;
   monitoring the rear seating area to detect presence or absence of a passenger in the rear seating area and
   executing a control routine based upon the vehicle operating state and the presence or absence of a passenger in the rear seating area
   wherein executing the control routine based upon the vehicle operating state and the presence or absence of a passenger in the rear seating area comprises executing an passenger distress detection routine when a passenger is present in the rear seating area and the vehicle is in the key-off state.

9. The method of claim 8, wherein executing a passenger distress detection routine comprises:
   collecting, via an in-vehicle microphone, in-vehicle sounds;
   executing a speech recognition routine including a frequency spectrum analysis of the in-vehicle sounds;
   determining formants using the frequency spectrum analysis;
   evaluating formants of the monitored audible data to determine whether they correspond to speech indicating passenger distress; and
   executing appropriate action when the formants correspond to speech indicating passenger distress.

10. The method of claim 9, wherein executing appropriate action when the formants correspond to speech indicating passenger distress comprises one of commanding opening one or more of the vehicle windows, adjusting ambient temperature in the passenger compartment by starting the vehicle and activating the HVAC system, and employing an on-board extra-vehicle communications system and associated GPS to notify emergency personnel of the vehicle location.

11. A method for monitoring a rear seating area of a vehicle passenger compartment that includes an extra-vehicle communications system and a rear seat-specific active noise cancellation device, the method comprising:
- monitoring a vehicle operating state comprising one of a key-on state and a key-off state;
- monitoring the rear seating area to detect a presence of a passenger in the rear seating area;
- executing a control routine including operating one of the extra-vehicle communications system and the rear seat-specific active noise cancellation device based upon the vehicle operating state when presence of a passenger is detected in the rear seating area; and
- executing a distress detection routine when a passenger is present in the rear seating area and the vehicle is in the key-off state, the distress detection routine including:
  - collecting, via an in-vehicle microphone, in-vehicle sounds,
  - executing a speech recognition routine including a frequency spectrum analysis of the in-vehicle sounds,
  - determining formants using the frequency spectrum analysis,
  - evaluating formants of the monitored audible data to determine whether they correspond to speech indicating distress, and
  - executing appropriate action when the formants correspond to speech indicating distress;
- wherein executing appropriate action when the formants correspond to speech indicating distress includes operating the extra-vehicle communications system.

12. The method of claim 11, further comprising dynamically executing a frequency spectrum analysis of the audio signals captured by the front and rear microphones to detect audible sounds associated with human speech and a magnitude of power associated therewith.

13. The method of claim 11, wherein monitoring the rear seating area to detect a presence of a passenger in the rear seating area comprises:
- monitoring input signals associated with a plurality of sensing devices and monitoring actuator commands from control elements associated with the rear seating area, including executing an audio signal processing routine to detect presence or absence of a passenger in the rear seating area, including:
  - dynamically capturing audio signals employing the front and rear microphones,
  - determining differences in times of arrival of the audio signals between the front and rear microphones,
  - determining differences in magnitudes of power of the audio signals between the front and rear microphones, and
  - evaluating the differences in times of arrival of the audio signals and the differences in magnitudes of power of the audio signals to determine the presence of a passenger in the rear seating area; and
- executing a sensor fusion routine to evaluate the input signals and the actuator commands.

\* \* \* \* \*